(12) United States Patent  
Pauken et al.

(10) Patent No.: US 8,303,016 B2
(45) Date of Patent: Nov. 6, 2012

(54) FLEXIBLE ARM STOWAGE RETAINER FOR VEHICLE

(75) Inventors: Junko Pauken, Canton, MI (US); James Hugh Fowler, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 12/482,535

(22) Filed: Jun. 11, 2009

(65) Prior Publication Data

US 2010/0314521 A1 Dec. 16, 2010

(51) Int. Cl.
*B60N 3/00* (2006.01)

(52) U.S. Cl. .................. 296/37.8; 296/24.34; 296/1.07; 248/302

(58) Field of Classification Search ............... 296/24.34, 296/37.1, 37.8, 1.07; 248/302; 24/3.1, 3.11, 24/3.12, 3.13, 457, 458; 410/77, 80, 96, 410/97

See application file for complete search history.

(56) References Cited

U.S. PATENT DOCUMENTS

| | | | |
|---|---|---|---|
| 2,392,024 A | 1/1946 | Couri | |
| 2,615,493 A | 10/1952 | Hunter | |
| 2,632,320 A | 3/1953 | Liss | |
| 2,643,042 A | 6/1953 | Mayer | |
| 2,982,392 A | 5/1961 | Bossone | |
| 3,762,097 A | 10/1973 | Gallo | |
| 4,014,508 A | 3/1977 | Weiss | |
| 4,487,537 A * | 12/1984 | Morse | 410/47 |
| 4,566,666 A * | 1/1986 | Meska et al. | 248/558 |
| 4,648,414 A | 3/1987 | Fox et al. | |
| D308,205 S | 5/1990 | Tholberg | |
| 5,083,732 A | 1/1992 | Akamine | |
| 5,232,189 A | 8/1993 | Koch | |
| 5,259,579 A | 11/1993 | Schneider | |
| 5,295,595 A | 3/1994 | Gobidas et al. | |
| 5,498,190 A | 3/1996 | Ganson | |
| 5,588,055 A | 12/1996 | Williamson et al. | |
| 5,655,999 A | 8/1997 | Drew | |
| 5,664,589 A | 9/1997 | Black | |
| 5,839,710 A | 11/1998 | Hubbard | |
| 5,875,792 A | 3/1999 | Campbell, Jr. et al. | |
| 5,916,006 A | 6/1999 | Ganson | |
| 6,397,854 B1 | 6/2002 | Bailey | |
| 6,513,779 B2 * | 2/2003 | Halpin | 248/451 |
| 6,547,117 B2 | 4/2003 | Glovatsky et al. | |
| D478,073 S | 8/2003 | Topinka | |
| 7,040,590 B2 | 5/2006 | Carnevali | |
| D577,358 S | 9/2008 | Kettula et al. | |
| 7,469,946 B2 * | 12/2008 | Daniel | 294/147 |
| 2004/0145205 A1 * | 7/2004 | Stahmer et al. | 296/37.8 |
| 2005/0258324 A1 | 11/2005 | La Tourelle | |
| 2006/0086870 A1 | 4/2006 | Nida | |
| 2007/0069102 A1 | 3/2007 | Kane | |
| 2007/0176449 A1 * | 8/2007 | Kukucka et al. | 296/24.34 |
| 2008/0136301 A1 | 6/2008 | Harbison et al. | |
| 2008/0143135 A1 * | 6/2008 | Singh et al. | 296/37.8 |

\* cited by examiner

*Primary Examiner* — Glenn Dayoan
*Assistant Examiner* — Jason S Daniels
(74) *Attorney, Agent, or Firm* — Raymond L. Coppiellie; Price Heneveld LLP

(57) ABSTRACT

A stowage retainer is provided for retaining an object, such as a portable electronic device, in a vehicle. The retainer includes a body having at least a bottom wall and side walls. The retainer also includes one or more flexible retention arms extending from the body for retaining a device in the retainer. The flexible retention arms each comprise a flexible inner wire and a soft outer covering material. The flexible retention arms are bendable to reform into a desired configuration to retain a device in the retainer.

23 Claims, 4 Drawing Sheets

FLEXIBLE ARM STOWAGE RETAINER FOR VEHICLE

FIELD OF THE INVENTION

The present invention generally relates to the retention of objects in a vehicle, and more particularly relates to a stowage retainer for retaining one or more small objects onboard the vehicle.

BACKGROUND OF THE INVENTION

Automotive vehicles are commonly equipped with consoles and storage trays or bins that are often used to hold objects, such as portable personal electronic devices including cell phones, PDAs, iPods®, MP3® music players, navigation devices and other similar devices onboard the vehicle. Additionally, automotive vehicles are also equipped with cup holders which are generally shaped and sized to receive a beverage container. The conventional storage compartments and trays generally lack an effective retention feature to secure individual items onboard the vehicle. As a consequence, users of the vehicle often will place small devices, such as cell phones, iPods®, MP3® music players, PDAs, handheld navigation devices, etc. into a cup holder, an open tray or bin or the top of the passenger seat. However, these smaller devices may shift around while the vehicle is driven and often end up on the floor. Additionally, when these items are placed in a cup holder or bin, they often rattle and distract the driver.

Accordingly, it is desirable to provide for a stowage retainer that may easily accommodate the holding of objects, such as cell phones, iPods®, MP3® music players, PDAs, handheld navigation devices, etc. in a manner that is convenient and easy to use.

SUMMARY OF THE INVENTION

According to one aspect of the present invention, a stowage retainer for retaining an object in a vehicle is provided. The stowage retainer comprises a body comprising one or more walls and at least one flexible retention arm extending from a wall of the holder for retaining an object in the retainer. The flexible retention arm comprises a flexible and deformable wire, wherein the flexible retention arm is bendable to reform into a desired configuration to retain the object in the retainer.

According to another aspect of the present invention, a retainer for retaining an object in a vehicle is provided. The retainer comprises at least one flexible retention arm extending from a structure. The flexible retention arm comprises an inner wire that is deformable into a desired configuration to retain an object. The flexible arm further comprises an outer covering extending over the inner wire, wherein a user may shape the flexible retention arm into a desired configuration to retain an object onboard the vehicle.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
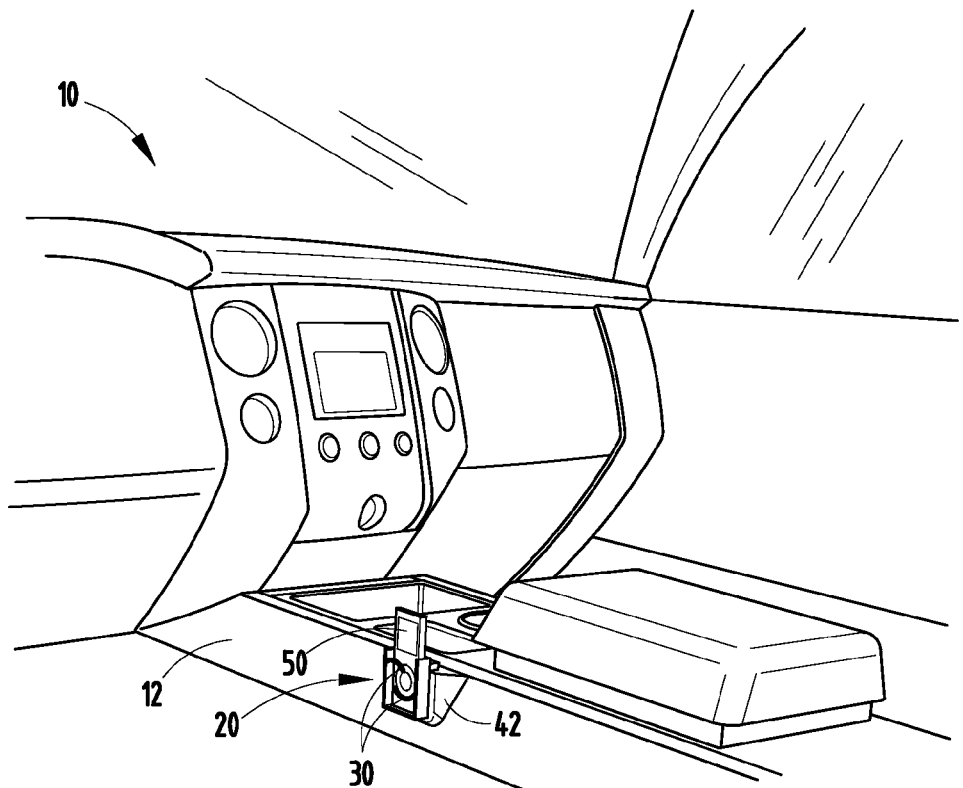
FIG. 1 is a perspective view of the center floor console of an automotive vehicle having a stowage retainer shown stowing a device, according to one embodiment.
Figure 2:
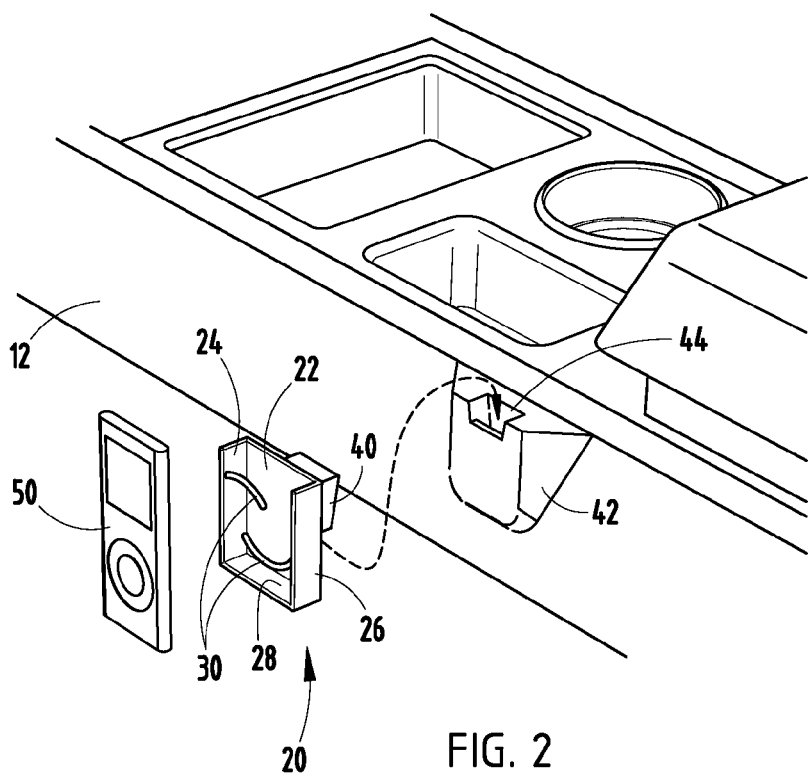
FIG. 2 is a perspective view of the stowage retainer shown removed from the center floor console and with the device removed from the retainer.
Figure 3:
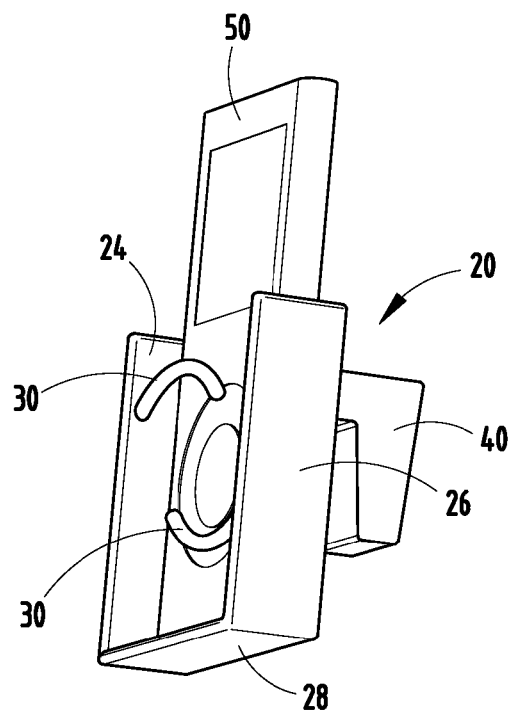
FIG. 3 is an enlarged perspective side view of the stowage retainer shown in FIG. 1.

Referring now to FIGS. 1-4, a stowage retainer 20 for retaining an object is illustrated connected to an automotive console, such as a center floor console 12, of an automotive vehicle 10, according to one embodiment. The stowage retainer 20 is shown removably connected to the center floor console 12, on one side, however, it should be appreciated that the stowage retainer 20 may be removably or fixedly installed at various locations in the passenger compartment of the vehicle 10, including the instrument panel, the dashboard, the door, other interior trim panels and other locations, especially at a location where a passenger in the vehicle 10 has access to the object held in the retainer 20.

The stowage retainer 20 is generally illustrated having a body or structure having a bottom wall 28 and three side walls including a back wall 22 and opposing left and right lateral side walls 24 and 26. The stowage retainer 20 also has a pair of flexible retention arms 30, shown extending from opposing lateral side walls 24 and 26. Each of the flexible retention arms 30 generally extends inward toward the opposing lateral wall and across a portion of the open front side so as to provide a retention feature that retains an object, such as a portable electronic device, stored within the retainer 20 on the front or fourth side. The top side of the stowage retainer 12 is generally shown open such that a portable electronic device 50 may partly extend from the retainer 20 and may be inserted into and removed from the retainer 20.

The stowage retainer 20 is also shown having a dovetail or wedge-shaped connector 40 extending generally rearward from the back wall 22. Connector 40 has a size and shape configured to conform to a size and shape of a receptacle 44 provided in mounting device 42 shown on one side of the center floor console 12. The wedge-shaped connector 40 may be disposed downward into receptacle 44 and may be locked into place via known fasteners, and may be removed by a user. The stowage retainer 20 may matingly engage a wedging interface or receptacle such as that shown and described in U.S. Patent Application Publication No. 2008/0143135 A1, the entire disclosure of which is hereby incorporated herein by reference.

The stowage retainer 20 may be configured in any of a number of sizes and shapes adapted to accommodate various objects, particularly portable electronic devices, that a user may bring into the vehicle 10. The device 50, shown herein as an iPod® according to one example, may be a portable electronic device that a user carries and employs outside of the vehicle 10 and carries into the vehicle 10 for use or transportation in the vehicle 10. The stowage retainer 20 provides an effective and easy to use retainer for retaining the device 50, and is particularly well suited to hold the device 50 during normal operation of the vehicle 10. The objects 50 held by the stowage retainer 20 may include any of a number of devices including, but not limited to, cell phones, iPods®, MP3® music players, PDAs, handheld navigation devices, and other objects. In the example shown in FIGS. 1-4, an iPod® 50 is generally shown inserted from the open top side into the stowage retainer 20, and the retainer 20, in turn, is connected via the dovetail or wedge connector 40 disposed into the receptacle 44 of mounting structure 42 to the center console 12. In this example, the iPod® 50 is held in place and retained at the front side by the flexible retention arms 30, and the iPod® 50 extends sufficiently upward and is viewable such that its display can be viewed by a user in the vehicle 10.

Figure 4:
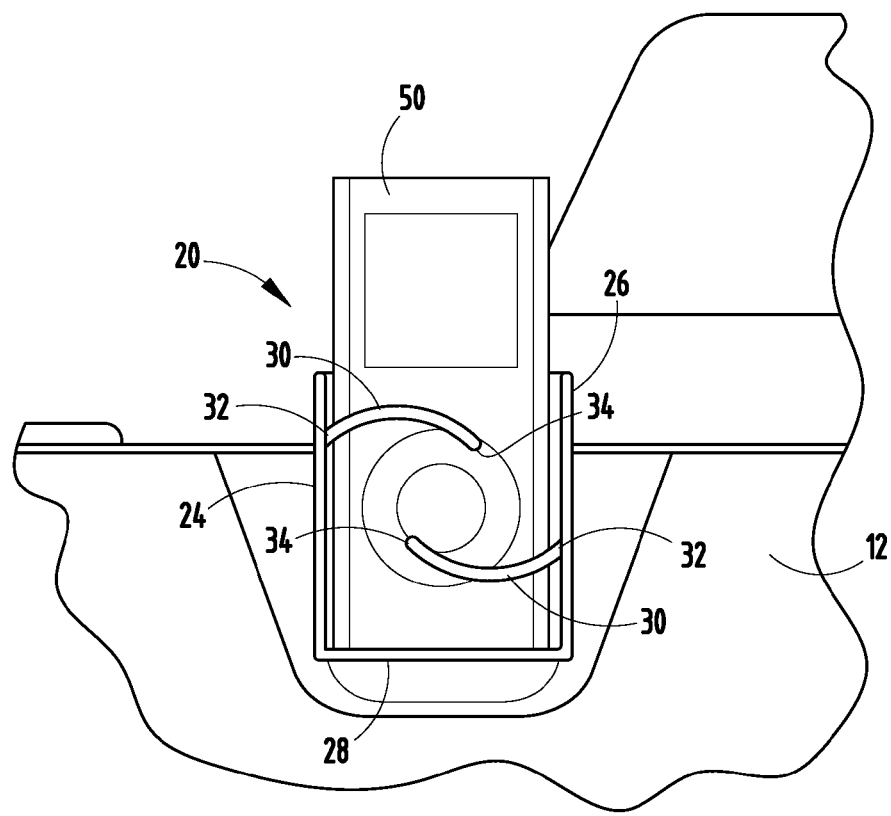
FIG. 4 is a front view of the stowage retainer with the device shown retained therein.

As seen in FIG. 4, each of the flexible retention arms 30 has a generally curved shape. The first flexible retention arm 30 has a first end 32 connected to a first lateral side wall 24 and the second flexible retention arm 30 has a first end 32 connected to the opposite second lateral side wall 26. Each of the retention arms 30 has an outer terminating end 34 which extends part-way or substantially across the front open side of the stowage retainer 20. It should be appreciated that the first end 32 of each retention arm 30 may be connected to the lateral wall 24 or 26 by inserting the first end 32 of flexible arm 30 into an opening in the side wall during assembly, according to one embodiment. According to other embodiments, it should be appreciated that the flexible retention arms 30 may be otherwise attached to the stowage retainer 20, such as by the use of fasteners, adhesives, molding and other known connector arrangements. It should also be appreciated that the flexible retention arms 30 are deformable and may have other shapes and sizes and may be connected to other structures, such as other walls of the stowage retainer 20.

Figure 8:
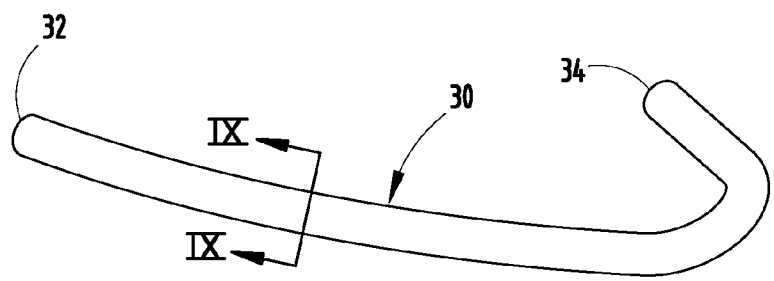
FIG. 8 is an enlarged view of the flexible stowage retention arm, according to one embodiment.
Figure 9:
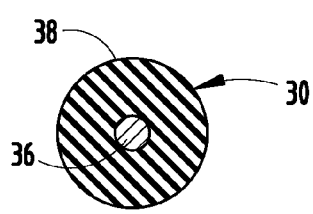
FIG. 9 is a cross-sectional view of the flexible stowage retention arm taken through line IX-IX of FIG. 8.

The flexible retention arms 30 are made up of an inner flexible and deformable wire 36 and a soft outer coating material 38 that covers the inner wire as shown in FIGS. 8 and 9 and described herein. The inner wire 36 and the coating material 38 are flexible and deformable such that the flexible retention arms 30 each may be bent to deform into a desired configuration by a user. Accordingly, a user may bend each flexible retention arm 30 into a desired shape to accommodate a device 50 and be retained and its particular size and shape such that the device 50 is snuggly retained within the stowage retainer 20.

Figure 5:
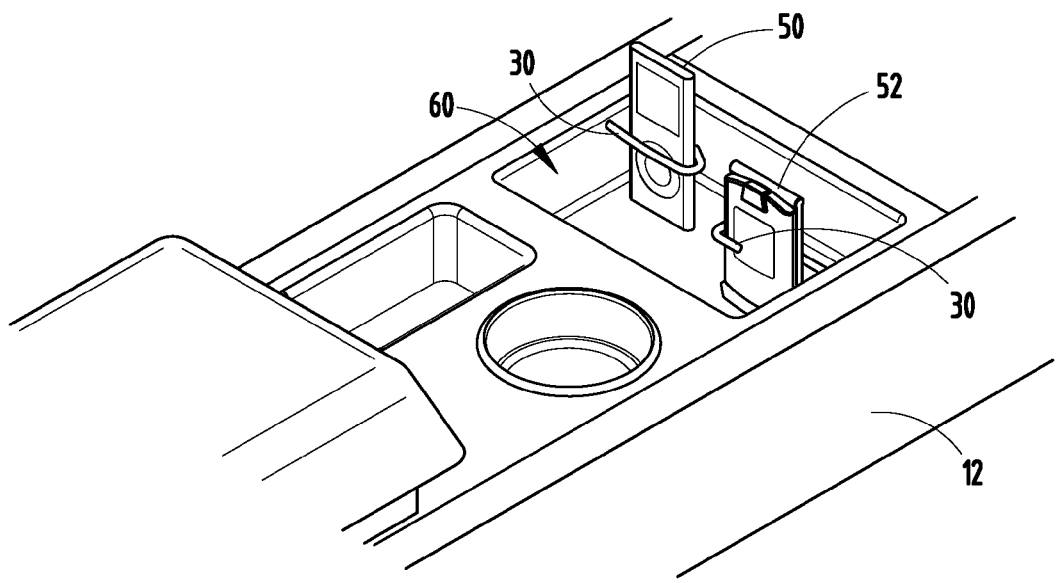
FIG. 5 is a perspective view of the center floor console of a vehicle having a bin with flexible arm stowage retention features for retaining devices, according to another embodiment.
Figure 6:
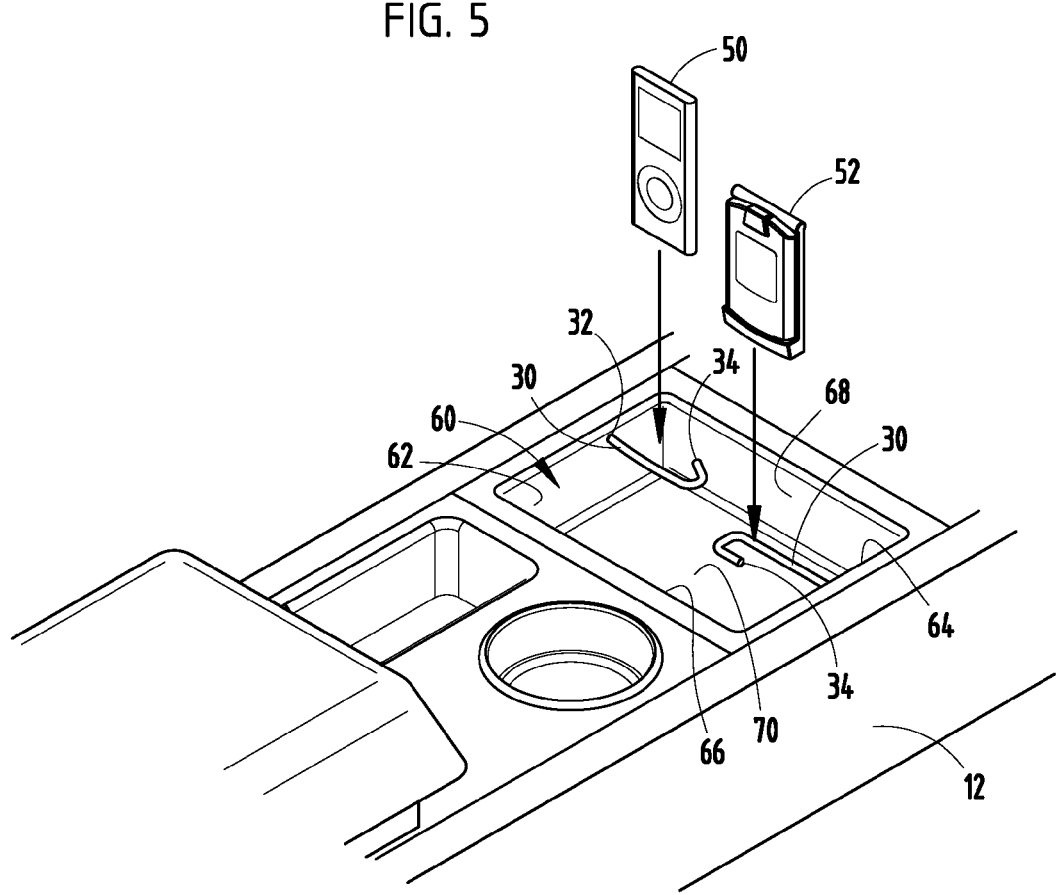
FIG. 6 is a perspective view of the center floor console illustrating the devices removed from the flexible stowage retention features.
Figure 7:
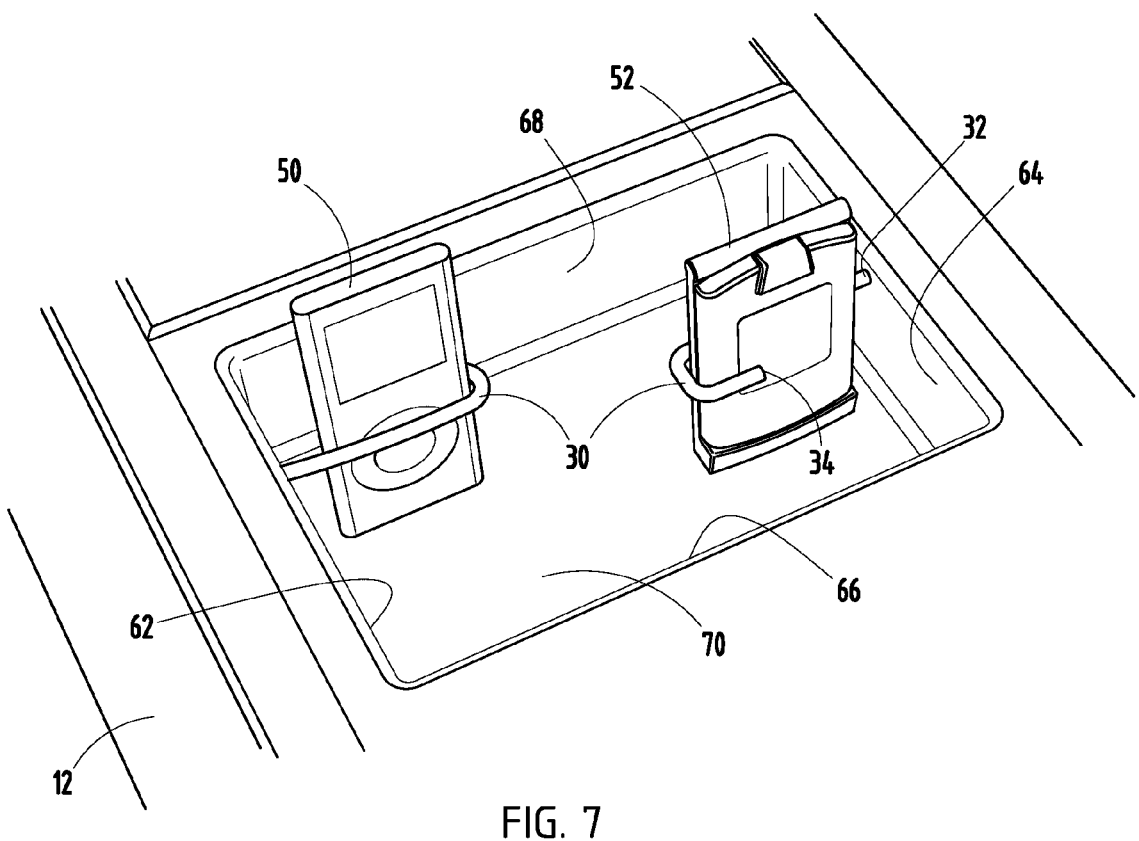
FIG. 7 is an enlarged view of the bin further illustrating the devices retained by the flexible arm stowage features of FIG. 5.

Referring to FIGS. 5-7, a stowage retainer 60 is illustrated employing flexible retention arms 30 shown retaining separate objects, according to a second embodiment. The stowage retainer 60 is shown provided in the center floor console 12 of the vehicle 10 and, in contrast to retainer 20, is shown employed in a tray or bin portion of the center floor console 12. The stowage retainer 60 generally includes four side walls 62, 64, 66 and 68, and a bottom wall 70 which generally define the bin or tray. Also included is a first flexible retention arm 30 extending from a first side wall 62 and a second flexible retention arm 30 extending from a second opposing side wall 64. Each of the flexible retention arms 30 has a first end 32 attached or otherwise connected to the corresponding wall and an outermost distal terminating end 34. In this embodiment, each of the flexible retention arms 30 is bent into a desired shape adapted to retain an object, such as portable electronic devices 50 and 52. Each flexible retention arm 30 holds a single device 50 or 52, in the example given, however, it should be appreciated that a plurality of flexible retention arms 30 could be employed to retain a single object or device or a single flexible retention arm 30 could retain more than one object or device. In this embodiment, the retention arms 30 have the terminating distal end 34 shown bent back in a generally J or L shape, such that the flexible resilient arms 30 extends along and retains the front side of a device 50 or 52 and retains a lateral side and part of the back side of the device 50 and 52, while the bottom surface 70 holds the bottom end of devices 50 and 52. As the vehicle 10 travels, the flexible retention arms 30 retain the devices 50 and 52 in position within the retainer 60. Should a user desire to retain an object having a different shape, each flexible retention arm 30 may be bent by the user to reform the arm 30 into a desired configuration adapted to accommodate the size and shape of the object to be held therein. It should further be appreciated that the stowage retainer 60 may retain an object, such as devices 50 or 52, by holding the object against more than one side wall in addition to the bottom wall 70 and flexible retention arm 30.

A flexible retention arm 30 that may be used in both retainers 20 and 60 is illustrated in FIGS. 8 and 9, according to one embodiment. As seen in FIG. 9, the flexible retention arm 30 has a central inner wire 36 and a soft outer coating 38 that covers the inner wire 36. The inner wire 36 and soft outer coating 38 are flexible and deformable such that the retention arm 30 may be bent by a user into a desired configuration, yet maintains enough resistance to hold the object retained in place under normal operating conditions of the vehicle 10. The flexible retention arm 30 is shown having a circular cross section, however, it should be appreciated that arm 30 may have alternative cross-sectional shapes including rectangular, diamond and oval shape. The inner wire 36 may include any metal wire that deforms and maintains the reformed shape, according to one embodiment. The soft outer covering 38 may include an elastomer, according to one embodiment. The elastomer may include a natural material such as rubber or a synthetic material such as polyvinyl that has elastic properties. According to another embodiment, the soft outer covering material 38 may include foam. The flexible retention arm 30 is therefore made of two different materials. The soft outer covering 38 eliminates squeaks and rattle noises while driving the vehicle 10. In addition, the soft outer covering 38 may protect the surface of the device 50 held therewith.

Figure 10:
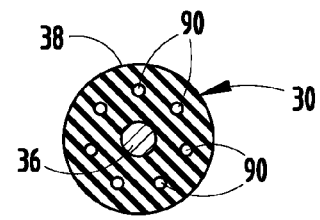
FIG. 10 is a cross-sectional view of a flexible stowage retention arm having fiber optics illumination, according to another embodiment.

The outer covering 38 of arm 30 may be opaque, according to one embodiment. According to other embodiments, the outer covering 38 of arm 30 may be transparent or translucent and can be photoluminescence, such that it glows in the dark. Referring to FIG. 10, the outer covering 38 may have one or more fiber optic cables 90 extending therein to provide fiber optics light illumination such that arm 30 is lighted, according to another embodiment. The entire arm 30 can be illuminated or a portion of the arm 30 with one or more desired patterns can be illuminated.

Accordingly, it should be appreciated that the stowage retainer 20 or 60 advantageously provides a retaining structure for retaining one or more objects onboard the vehicle 10. The stowage retainer 20 or 60 advantageously allows a user to travel with objects, such as portable electronic devices, in an organized and efficient manner and allows for easy use despite variations in the size, shape, and different types of devices.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A stowage retainer for retaining an object in a vehicle, said stowage retainer comprising:
   a body comprising a bottom wall and one or more side walls in the vehicle; and
   at least one flexible retention arm for retaining an object in the retainer, said flexible retention arm comprising a flexible and deformable wire having a first end attached to one of said side walls and a distal end free from said side walls, wherein the bottom wall supports the object, the side walls surround the object and the flexible retention arm positions the object on the bottom wall apart from said side walls, and wherein the flexible retention arm is bendable to reform into a desired configuration to retain the object in a desired position in the retainer.

2. The stowage retainer as defined in claim 1, wherein the flexible retention arm further comprises a soft outer material covering the wire.

3. The stowage retainer as defined in claim 2, wherein the outer material comprises an elastomer.

4. The stowage retainer as defined in claim 2, wherein the outer material comprises at least one of foam, rubber and polyvinyl.

5. The stowage retainer as defined in claim 1, wherein the object comprises a portable electronic device.

6. The stowage retainer as defined in claim 1, wherein the at least one flexible retention arm comprises first and second flexible retention arms each having a distal end free from the side walls and extending from one or more side walls of the body.

7. The stowage retainer as defined in claim 6, wherein the first flexible retention arm extends from a first wall and the second flexible retention arm extends from a second wall, and wherein the first wall is opposite the second wall.

8. The stowage retainer as defined in claim 1, wherein the body comprises at least three side walls defining first, second and third sides and a bottom wall, wherein the at least one flexible retention arm retains the object from a fourth side.

9. The stowage retainer as defined in claim 1, wherein the retainer is disposed in a receptacle in the vehicle, and wherein the stowage retainer is removable from the receptacle.

10. The stowage retainer as defined in claim 9, wherein the body comprises a connector adapted to engage the receptacle.

11. The stowage retainer as defined in claim 1, wherein the stowage retainer comprises a plurality of flexible retention arms, wherein each flexible retention arm has a distal end free from the walls and retains a separate object.

12. A retainer for retaining an object in a vehicle, said retainer comprising:
   at least one flexible retention arm extending from a structure comprising a bottom wall and one or more side walls in the vehicle, said flexible retention arm having a first end attached to one of said side walls and a distal end free from said side walls and comprising an inner wire that is deformable into a desired configuration to retain an object, said flexible retention arm further comprising an outer covering extending over the inner wire, wherein the side walls surround the object, and the object is supported by the bottom wall apart from said side walls and positioned by the flexible retention arm, and wherein a user may shape the flexible retention arm into a desired configuration to retain and stow the object in a desired position onboard the vehicle.

13. The retainer as defined in claim 12, wherein the outer covering comprises a soft material.

14. The retainer as defined in claim 13, wherein the outer covering comprises an elastomer.

15. The retainer as defined in claim 13, wherein the outer covering comprises at least one of foam, rubber and polyvinyl.

16. The retainer as defined in claim 12, wherein the at least one flexible retention arm comprises first and second flexible retention arms each having a distal end free from the side walls and extending from one or more sides of the structure.

17. The retainer as defined in claim 16, wherein the first flexible retention arm extends from a first wall and the second flexible retention arm extends from a second wall opposing the first wall.

18. The retainer as defined in claim 12, wherein the retainer comprises at least three side walls defining first, second and third sides, wherein the at least one flexible retention arm retains the object from a fourth side.

19. The retainer as defined in claim 12, wherein the retainer is disposed in a receptacle in the vehicle, and wherein the retainer is removable from the receptacle.

20. The retainer as defined in claim 12, wherein the retainer comprises a plurality of flexible retention arms, wherein each flexible retention arm has a distal end free from the walls and retains a separate object.

21. The retainer as defined in claim 12, wherein the object comprises a portable electronic device.

22. A stowage retainer for retaining an object comprising:
   a retainer body comprising a bottom wall and side wails; and
   a flexible retention arm comprising a flexible and deformable wire having a first end attached to a side wall and a distal end free from the side walls, wherein the bottom wall supports the object, the side walls surround the object and the flexible retention arm is bendable to retain the object in a desired position.

23. The retainer as defined in claim 22, wherein the retainer body comprises a tray in a vehicle.

* * * * *